US011999212B1

(12) United States Patent
Smith et al.

(10) Patent No.: US 11,999,212 B1
(45) Date of Patent: Jun. 4, 2024

(54) SYSTEM AND METHOD FOR TRACKING TERRAIN OBJECTS

(71) Applicant: GM GLOBAL TECHNOLOGY OPERATIONS LLC, Detroit, MI (US)

(72) Inventors: Dustin Howard Malcom Smith, Clarkston, MI (US); Sai Vishnu Aluru, Commerce Township, MI (US); Timothy D Demetrio, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/162,935

(22) Filed: Feb. 1, 2023

(51) Int. Cl.
| | |
|---|---|
| *B60G 17/0165* | (2006.01) |
| *B60G 17/015* | (2006.01) |
| *G06V 10/44* | (2022.01) |
| *G06V 20/58* | (2022.01) |

(52) U.S. Cl.
CPC ..... *B60G 17/0165* (2013.01); *B60G 17/0155* (2013.01); *G06V 10/44* (2022.01); *G06V 20/58* (2022.01); *B60G 2400/82* (2013.01); *B60G 2500/30* (2013.01)

(58) Field of Classification Search
CPC ............ B60G 17/0165; B60G 17/0155; B60G 2400/82; B60G 2500/30; G06V 20/58; G06V 10/44
See application file for complete search history.

(56) References Cited

U.S. PATENT DOCUMENTS

| | | | |
|---|---|---|---|
| 11,919,354 B2* | 3/2024 | Guest .................. | B60G 17/016 |
| 11,928,399 B1* | 3/2024 | Dolan .................... | G06F 30/20 |
| 11,932,242 B1* | 3/2024 | Crego ................... | G06V 20/58 |
| 2014/0222287 A1* | 8/2014 | Popham ............ | B60G 17/0165 |
| | | | 701/37 |
| 2023/0040600 A1* | 2/2023 | Abdallah ........... | B60G 17/0155 |
| 2023/0123508 A1* | 4/2023 | Kim ...................... | B60W 40/06 |
| | | | 701/1 |
| 2023/0230471 A1* | 7/2023 | Guney ................. | G08G 1/0133 |
| | | | 701/26 |
| 2023/0249509 A1* | 8/2023 | Matthews ................ | B60G 3/14 |
| | | | 180/204 |
| 2023/0311605 A1* | 10/2023 | Lee .......................... | B25J 19/02 |
| | | | 280/5.514 |

\* cited by examiner

*Primary Examiner* — Toan C To
(74) *Attorney, Agent, or Firm* — Lorenz & Kopf LLP

(57) ABSTRACT

A clearance risk detection system is provided in a vehicle. The clearance risk detection system is configured to: identify a terrain object in a vehicle travel path; classify the terrain object based on whether the host vehicle can clear the terrain object or cannot clear the terrain object; provide a first indicator that indicates that the host vehicle can clear the terrain object when appropriate; provide a second indicator that indicates that the host vehicle can clear the terrain object with a suggested raising of vehicle ride height when appropriate; automatically raise the vehicle ride height when appropriate; and provide a third indicator that indicates that the host vehicle cannot clear the terrain object even with raising vehicle ride height when appropriate.

20 Claims, 9 Drawing Sheets

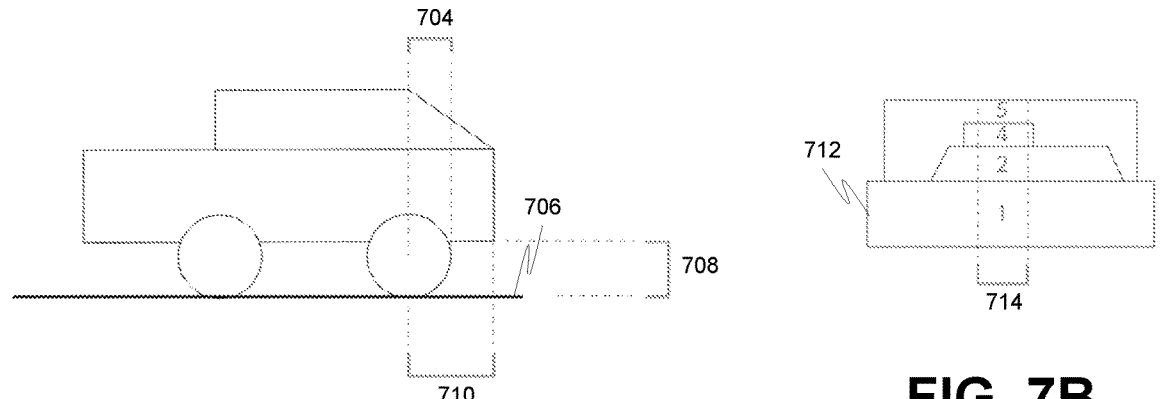
FIG. 7A
FIG. 7B
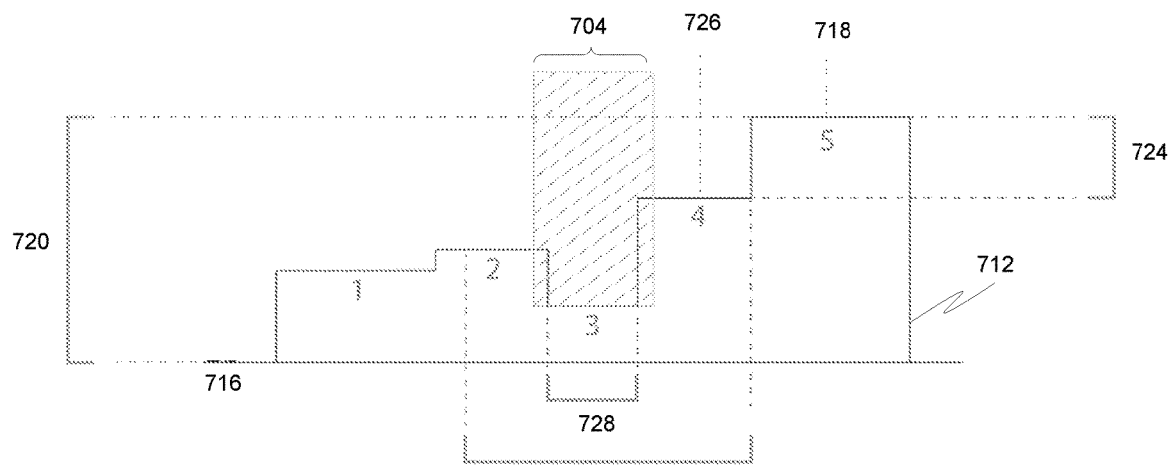
FIG. 7C
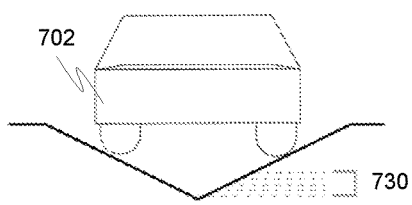
FIG. 7D
FIG. 7E

SYSTEM AND METHOD FOR TRACKING TERRAIN OBJECTS

INTRODUCTION

The technical field generally relates to systems, methods, and apparatuses for providing driver assistance during vehicle operations and more particularly relates to systems, methods, and apparatuses for identifying whether an obstacle in a vehicle's path may pose a risk to the vehicle while attempting to scale the obstacle.

When driving off road, it can be difficult to navigate obstacles without a spotter. Blind spots can make driving off road difficult for a vehicle operator without an advanced camera system to pilot the vehicle over challenging terrain. Even with cameras in use, it can be difficult to judge whether upcoming obstacles (e.g., boulders, logs, blocks) can be cleared by the vehicle without contacting the vehicle's fascia or underbody components, potentially damaging them.

It is therefore desirable for methods, systems, and apparatuses for providing driver assistance features to assist a vehicle operator to navigate a vehicle in view of upcoming obstacles. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are vehicles with, methods for, and systems for driving assistance. In some aspects, the techniques described herein relate to a clearance risk detection system in a vehicle. The clearance risk detection system is configured to: identify a terrain object in a vehicle travel path, classify the terrain object based on whether a host vehicle ride height allows the host vehicle to clear the terrain object, provide a first indicator when appropriate that indicates that the host vehicle ride height allows the host vehicle to clear the terrain object, provide a second indicator when appropriate that indicates that a suggested raising of host vehicle ride height allows the host vehicle to clear the terrain object, automatically raise the host vehicle ride height when appropriate, and provide a third indicator when appropriate that indicates that the host vehicle cannot clear the terrain object even with raising vehicle ride height.

In some aspects, the techniques described herein relate to a host vehicle including: an air suspension system that is configured to dynamically raise or lower ride height of the host vehicle; a human machine interface (HMI) including a display screen; and a controller for implementing a clearance risk detection system, the controller configured to: identify a terrain object in a travel path of the host vehicle (e.g., via machine learning software); classify the terrain object based on whether: a host vehicle ride height allows the host vehicle to clear the terrain object, a raising of host vehicle ride height allows the host vehicle to clear the terrain object (e.g., without raising vehicle ride height can clear highest point of underbody but not lowest point of underbody; or without raising vehicle ride height cannot clear highest point of underbody), and the host vehicle cannot clear the terrain object with raising vehicle ride height; provide a first indicator (e.g., aural or visual) via the HMI based on terrain object classification that indicates that a suggested raising of vehicle ride height allows the host vehicle to clear the terrain object; and provide a second indicator (e.g., aural or visual) via the HMI based on terrain object classification that indicates that raising vehicle ride height will not allow the host vehicle to clear the terrain object.

In some aspects, the techniques described herein relate to a host vehicle, wherein the controller is configured to automatically raise the vehicle ride height via the air suspension system to clear the terrain object when raising vehicle ride height will allow the host vehicle to clear the terrain object.

In some aspects, the techniques described herein relate to a host vehicle, wherein the controller is further configured to: provide the first indicator only when automatically raising the vehicle ride height to clear the terrain object is not available in the host vehicle.

In some aspects, the techniques described herein relate to a host vehicle, wherein the HMI is configured to provide an augmented reality (AR) view of a vehicle travel path that includes the terrain object, and wherein to provide the first indicator via the HMI, the controller is configured to: provide a graphical element (e.g., color, symbol, or highlighting) on the terrain object depicted in the vehicle travel path displayed on the HMI that identifies that raising vehicle ride height will allow the host vehicle to clear the terrain object.

In some aspects, the techniques described herein relate to a host vehicle, wherein to provide the second indicator via the HMI, the controller is further configured to: provide a graphical element (e.g., color, symbol, or highlighting) on the terrain object depicted in the vehicle travel path displayed on the HMI that identifies that raising vehicle ride height will not allow the host vehicle to clear the terrain object.

In some aspects, the techniques described herein relate to a host vehicle, wherein the controller is further configured to provide a graphical element (e.g., color, symbol, or highlighting) on the terrain object depicted in the vehicle travel path displayed on the HMI that identifies that the vehicle ride height is high enough to allow the host vehicle to clear the terrain object without raising vehicle ride height.

In some aspects, the techniques described herein relate to a host vehicle, wherein to identify a terrain object in a travel path of the host vehicle, the controller is configured to: acquire one or more image frames in the travel path of the host vehicle; and apply edge detection techniques to identify an object.

In some aspects, the techniques described herein relate to a host vehicle, wherein to identify a terrain object in a travel path of the host vehicle when object detection is unclear, the controller is further configured to: flash vehicle lights to create a shadow of the terrain object; capture an image frame that includes the shadow of the terrain object; analyze the shadow; and estimate an object dimension based on analyzing the shadow.

In some aspects, the techniques described herein relate to a host vehicle, wherein to classify the terrain object the controller is configured to: acquire an object dimension for the terrain object; determine if the terrain object is in the travel path of the host vehicle based on speed and steering direction of the host vehicle; and determine if the terrain object is clearable by the host vehicle based on riding height and tire pressure of the host vehicle.

In some aspects, the techniques described herein relate to a host vehicle, wherein to classify the terrain object the controller is further configured to determine whether the terrain object is clearable by the host vehicle based on riding height and tire pressure of the host vehicle using a look up table.

In some aspects, the techniques described herein relate to a method in a controller-implemented clearance risk detection system in a host vehicle, the method including: identifying a terrain object based on camera image data in a travel path of the host vehicle (e.g., via machine learning software); classifying the terrain object based on whether: a host vehicle ride height allows the host vehicle to clear the terrain object, a raising of host vehicle ride height allows the host vehicle to clear the terrain object (e.g., without raising vehicle ride height can clear highest point of underbody but not lowest point of underbody; or without raising vehicle ride height cannot clear highest point of underbody), and the host vehicle cannot clear the terrain object with raising vehicle ride height; providing a first indicator (e.g., aural or visual) based on terrain object classification via a human machine interface (HMI) in the host vehicle that indicates that a suggested raising of vehicle ride height using an air suspension system in the host vehicle allows the host vehicle to clear the terrain object; and providing a second indicator (e.g., aural or visual) based on terrain object classification via the HMI that indicates that raising vehicle ride height will not allow the host vehicle to clear the terrain object.

In some aspects, the techniques described herein relate to a method, including automatically raising the vehicle ride height via the air suspension system to clear the terrain object when raising vehicle ride height will allow the host vehicle to clear the terrain object.

In some aspects, the techniques described herein relate to a method, further including: providing the first indicator only when automatically raising the vehicle ride height to clear the terrain object is not available in the host vehicle.

In some aspects, the techniques described herein relate to a method, wherein the HMI is configured to provide an augmented reality (AR) view of a vehicle travel path that includes the terrain object, and providing the first indicator via the HMI includes: providing a graphical element (e.g., color, symbol, or highlighting) on the terrain object depicted in the vehicle travel path displayed on the HMI that identifies that raising vehicle ride height will allow the host vehicle to clear the terrain object as an obstacle.

In some aspects, the techniques described herein relate to a method, wherein providing the second indicator via the HMI includes: providing a graphical element (e.g., color, symbol, or highlighting) on the terrain object depicted in a vehicle travel path displayed on the HMI that identifies that raising vehicle ride height will not allow the host vehicle to clear the terrain object.

In some aspects, the techniques described herein relate to a method, further including providing a graphical element (e.g., color, symbol, or highlighting) on the terrain object depicted in the vehicle travel path displayed on the HMI that identifies that the vehicle ride height is high enough to allow the host vehicle to clear the terrain object without raising vehicle ride height.

In some aspects, the techniques described herein relate to a method, wherein identifying a terrain object in a travel path of the host vehicle includes: acquiring one or more image frames in the travel path of the host vehicle; and applying edge detection techniques to identify an object.

In some aspects, the techniques described herein relate to a method, wherein identifying a terrain object in a travel path of the host vehicle when object detection is unclear includes: flashing vehicle lights to create a shadow of the terrain object; capturing an image frame that includes the shadow of the terrain object; analyzing the shadow; and estimating an object dimension based on analyzing the shadow.

In some aspects, the techniques described herein relate to a method, wherein classifying the terrain object includes: acquiring an object dimension for the terrain object; determining if the terrain object is in the travel path of the host vehicle based on speed and steering direction of the host vehicle; and determining if the terrain object is clearable by the host vehicle based on riding height and tire pressure of the host vehicle.

In some aspects, the techniques described herein relate to a method, wherein classifying the terrain object includes determining whether the terrain object is clearable by the host vehicle based on riding height and tire pressure of the host vehicle using a look up table.

In some aspects, the techniques described herein relate to a clearance risk detection system in a host vehicle including a controller, the controller configured to: identify a terrain object in a travel path of the host vehicle (e.g., using machine learning software); classify the terrain object based on whether: a host vehicle ride height allows the host vehicle to clear the terrain object, a raising of host vehicle ride height allows the host vehicle to clear the terrain object (e.g., without raising vehicle ride height can clear highest point of underbody but not lowest point of underbody; or without raising vehicle ride height cannot clear highest point of underbody), and the host vehicle cannot clear the terrain object with raising vehicle ride height; provide a first indicator (e.g., aural or visual) based on terrain object classification via a human machine interface (HMI) that indicates that a suggested raising of vehicle ride height allows the host vehicle to clear the terrain object; and provide a second indicator (e.g., aural or visual) based on terrain object classification via the HMI that indicates that raising vehicle ride height will not allow the host vehicle to clear the terrain object.

In some aspects, the techniques described herein relate to a clearance risk detection system, wherein the controller is configured to automatically raise the vehicle ride height via an air suspension system to clear the terrain object when raising vehicle ride height will allow the host vehicle to clear the terrain object.

In some aspects, the techniques described herein relate to a clearance risk detection system, wherein the controller is further configured to: provide the first indicator only when automatically raising the vehicle ride height to clear the terrain object is not available in the host vehicle.

In some aspects, the techniques described herein relate to a clearance risk detection system, wherein the HMI is configured to provide an augmented reality (AR) view of a vehicle travel path that includes the terrain object, and wherein to provide the first indicator via the HMI, the controller is configured to: provide a graphical element (e.g., color, symbol, or highlighting) on the terrain object depicted in the vehicle travel path displayed on the HMI that identifies that raising vehicle ride height will allow the host vehicle to clear the terrain object t.

In some aspects, the techniques described herein relate to a clearance risk detection system, wherein to provide the second indicator via the HMI, the controller is further configured to: provide a graphical element (e.g., color, symbol, or highlighting) on the terrain object depicted in a vehicle travel path displayed on the HMI that identifies that raising vehicle ride height will not allow the host vehicle to clear the terrain object.

In some aspects, the techniques described herein relate to a clearance risk detection system, wherein the controller is further configured to provide a graphical element (e.g., color, symbol, or highlighting) on the terrain object depicted in the vehicle travel path displayed on the HMI that identifies that the vehicle ride height is high enough to allow the host vehicle to clear the terrain object without raising vehicle ride height.

In some aspects, the techniques described herein relate to a clearance risk detection system, wherein to identify a terrain object in a travel path of the host vehicle, the controller is configured to: acquire one or more image frames in the travel path of the host vehicle; and apply edge detection techniques to identify an object.

In some aspects, the techniques described herein relate to a clearance risk detection system, wherein to identify a terrain object in a travel path of the host vehicle when object detection is unclear, the controller is further configured to: flash vehicle lights to create a shadow of the terrain object; capture an image frame that includes the shadow of the terrain object; analyze the shadow; and estimate an object dimension based on analyzing the shadow.

In some aspects, the techniques described herein relate to a clearance risk detection system, wherein to classify the terrain object the controller is configured to: acquire an object dimension for the terrain object; determine if the terrain object is in the travel path of the host vehicle based on speed and steering direction of the host vehicle; and determine if the terrain object is clearable by the host vehicle based on riding height and tire pressure of the host vehicle.

In some aspects, the techniques described herein relate to a clearance risk detection system, wherein to classify the terrain object the controller is further configured to determine whether the terrain object is clearable by the host vehicle based on riding height and tire pressure of the host vehicle using a look up table.

BRIEF DESCRIPTION OF THE DRAWINGS

The exemplary embodiments will hereinafter be described in conjunction with the following drawing figures, wherein like numerals denote like elements, and wherein:

FIGS. 7A-7E are block diagrams illustrating example parameters that the clearance risk detection system may take into account to determine if a host vehicle can clear an obstacle, in accordance with various embodiments;

DETAILED DESCRIPTION

Figure 1A:
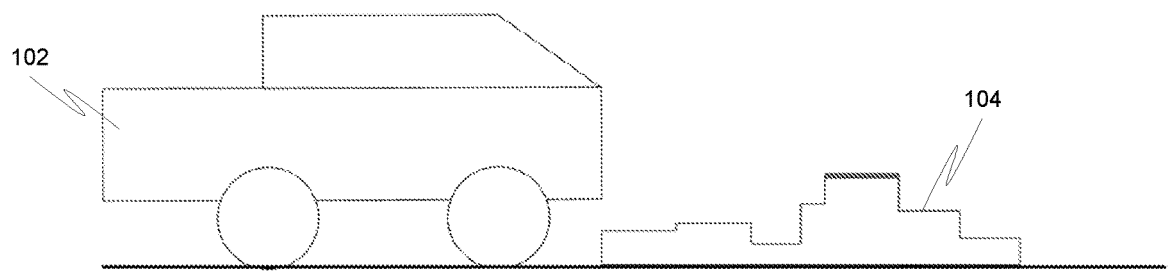
FIGS. 1A-1C are block diagrams illustrating example operations that can be performed with a host vehicle when a terrain object is encountered using a clearance risk detection system in the host vehicle, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various embodiments, apparatus, systems, techniques, and articles are disclosed for providing driving assistance via an intelligent system that can assist the vehicle operator navigate in view of potential terrain obstacles, such as boulders, logs, blocks, and others. In various embodiments, apparatus, systems, techniques, and articles are disclosed that incorporate vehicle system knowledge of the vehicle's ride height, tire pressures, and underbody protrusions to inform the vehicle operator whether a terrain obstacle can be cleared by the vehicle. In various embodiments, apparatus, systems, techniques, and articles are disclosed that apply machine vision techniques to external vehicle camera feeds to classify terrain obstacles. In various embodiments, apparatus, systems, techniques, and articles are disclosed that use existing vehicle sensors to measure the topography of the terrain in the vehicle's path, and compare the measured topography to an internal database that is descriptive of the vehicle's external geometry (e.g., ride height, clearance to low-hanging components such as differential).

In various embodiments, apparatus, systems, techniques, and articles are disclosed that can provide cockpit displays that show an upcoming terrain obstacle that is marked based on whether the terrain obstacle can be cleared by the vehicle. In various embodiments, apparatus, systems, techniques, and articles are disclosed that can provide notifications to the vehicle operator that inform whether an upcoming terrain obstacle may be cleared by the vehicle. In various embodiments, apparatus, systems, techniques, and articles are disclosed that can provide a suggestion (or automatic selection) of an available upward ride height adjustment to allow the vehicle to clear the terrain obstacle.

In various embodiments, apparatus, systems, techniques, and articles are disclosed that can provide cockpit displays that overlay augmented reality (AR) graphics over a view of the upcoming terrain wherein terrain obstacles are marked based on whether the terrain obstacle can be cleared by the vehicle. In various embodiments, apparatus, systems, techniques, and articles are disclosed that can provide different graphic markings and notifications based on whether a terrain obstacle can be cleared at the lowest point of the vehicle underbody, the highest point of the vehicle underbody (but not the lowest), or cannot be cleared under any part of the vehicle.

In various embodiments, apparatus, systems, techniques, and articles are disclosed that can provide a series of asynchronous alerts and/or sounds that warn of an upcoming terrain obstacle. In various embodiments, apparatus, systems, techniques, and articles are disclosed that can provide for the alerts to escalate in saliency based on the distance to the obstacle.

Figure 1B:
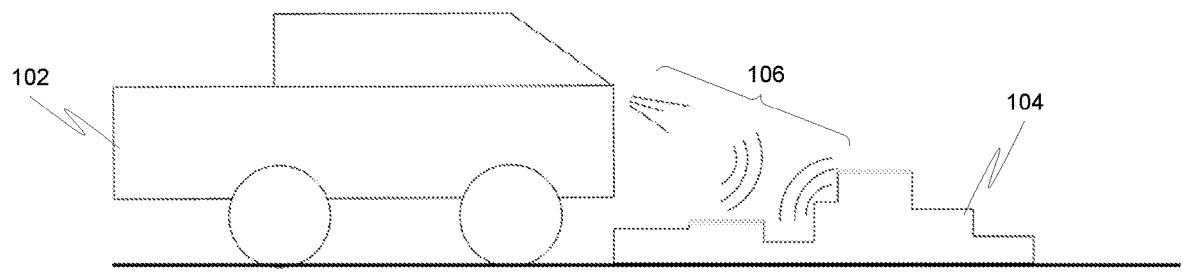
Figure 1C:
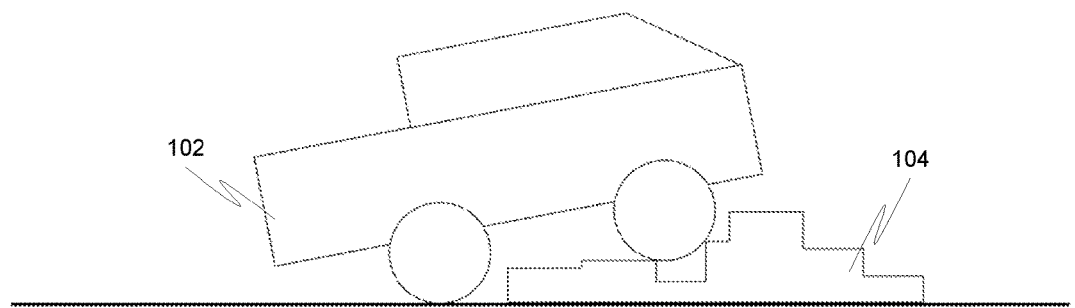

FIGS. 1A-1C are block diagrams illustrating example operations that can be performed with a host vehicle when a terrain object is encountered using a clearance risk detection system in the host vehicle. As illustrated by FIG. 1A, when a terrain object is sensed, e.g., by the vehicle operator (e.g., remote or onboard vehicle driver) or an obstacle detection system in the vehicle, the vehicle operator can cause the host vehicle 102 to approach the terrain object 104 and pause movement before reaching the terrain object 104.

As illustrated by FIG. 1B, after pausing, the vehicle operator can command a clearance risk detection system in the host vehicle 102 to take measurements 106 of the terrain object 104. The vehicle operator, for example, may engage a button associated with a human machine interface (HMI) in the vehicle to initiate the taking of measurements. The clearance risk detection system can cause vehicle sensors, such as cameras, radar, LiDAR, and others to measure the terrain object.

As illustrated by FIG. 1C, after taking measurements and determining that the host vehicle 102 can clear the terrain object 104, the clearance risk detection system can alert the vehicle operator that the terrain object 104 may be cleared either with or without changing the ride height of the host vehicle 102 (automatically by the clearance risk detection system or manually by the vehicle operator). The vehicle operator may then cause the host vehicle 102 to cross over the terrain object 104 upon notice that the host vehicle 102 can clear the terrain object with any ride height adjustment needed to be made.

Figure 2:
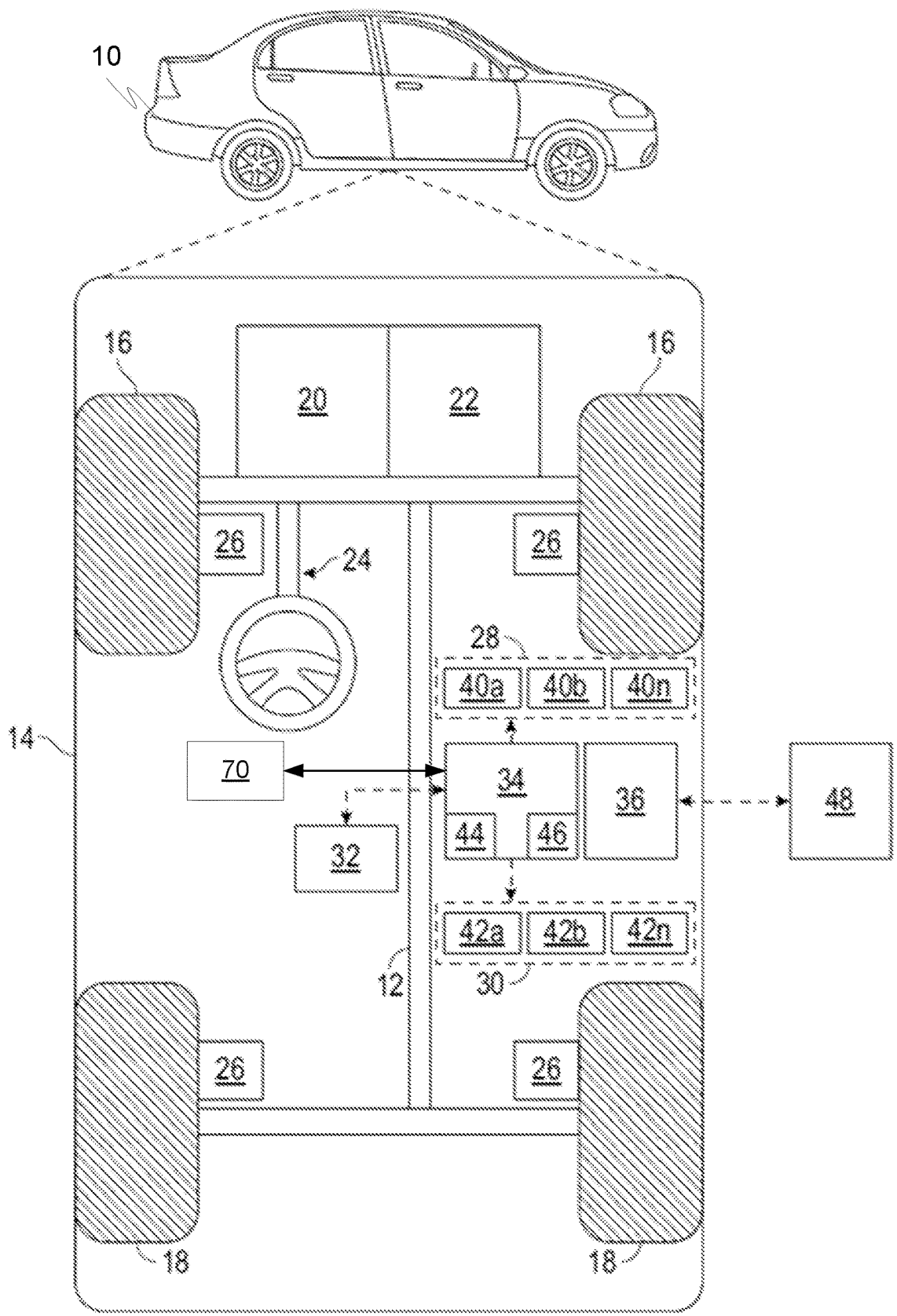
FIG. 2 is a block diagram depicting an example vehicle that includes a clearance risk detection system for identifying and classifying terrain objects in the travel path of the vehicle that pose a risk for the vehicle, in accordance with various embodiments.

FIG. 2 is a block diagram depicting an example vehicle 10 that includes a clearance risk detection system 70 for identifying and classifying terrain objects in the travel path of the vehicle that pose a risk for the vehicle. As depicted in FIG. 2, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 is capable of being driven manually, autonomously and/or semi-autonomously.

Figure 3:
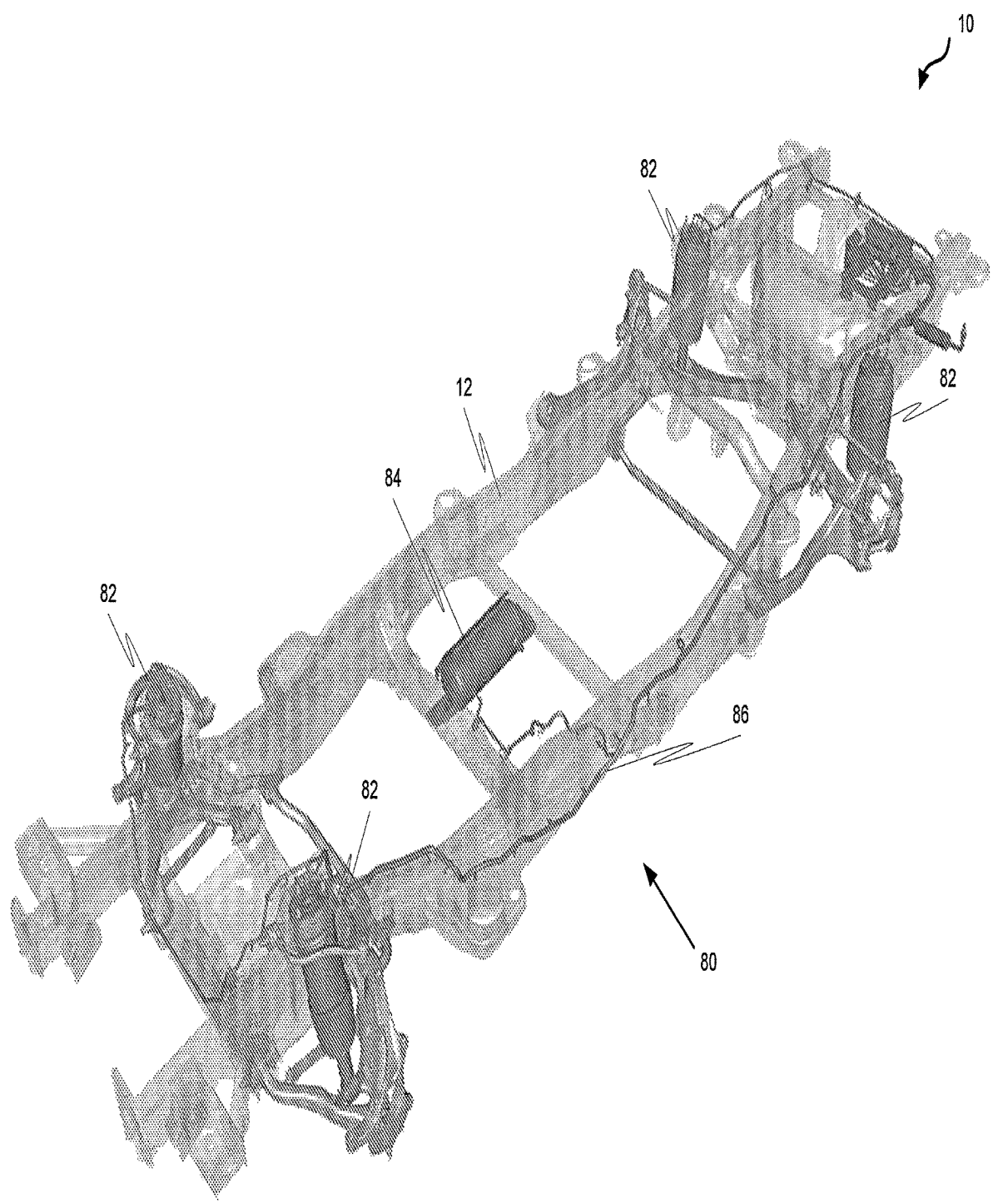
FIG. 3 is an isometric diagram depicting an example air suspension system attached to a chassis in a vehicle, in accordance with various embodiments.

The vehicle 10 further includes an air suspension system (not shown). The air suspension system is capable of providing ride-height adjustment for the vehicle. FIG. 3 is an isometric diagram depicting an example air suspension system 80 attached to a chassis 12 in a vehicle 10. The example air suspension system 80 includes a suspension controller (not shown), a plurality of shock absorbers 82 and an air pump 84. When commanded, the air suspension system 80 pumps air, via the air pump 84 and the lines 86, into each shock absorber 82 to raise the vehicle 10, or pumps air out to lower the vehicle 10.

In various embodiments, the air suspension system 80 is capable of providing ride-height adjustment of up to about 4 inches, automatic load-leveling at all four corners, automatic ride-height adjustment, manual ride height adjustment, and additional ground clearance. In some embodiments, drivers can raise the body for additional ground clearance when driving off-road by a first predetermined amount, e.g., about 1 inch at low speeds, and a second predetermined amount, e.g., an additional about 1 inch at even lower speeds.

Referring back to FIG. 2, the vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices.

The sensor system 28 includes one or more sensing devices 40a-40n that sense observable conditions of the exterior environment and/or the interior environment of the autonomous vehicle 10. The sensing devices 40a-40n can include but are not limited to, radars, LiDAR, global positioning systems, optical cameras, thermal cameras, ultrasonic sensors, inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, the brake system 26, and the air suspension system 80.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 2, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to implement a clearance risk detection system 70 for identifying and classifying terrain objects in the travel path of the vehicle 10 that pose a risk for the vehicle 10.

Figure 4:
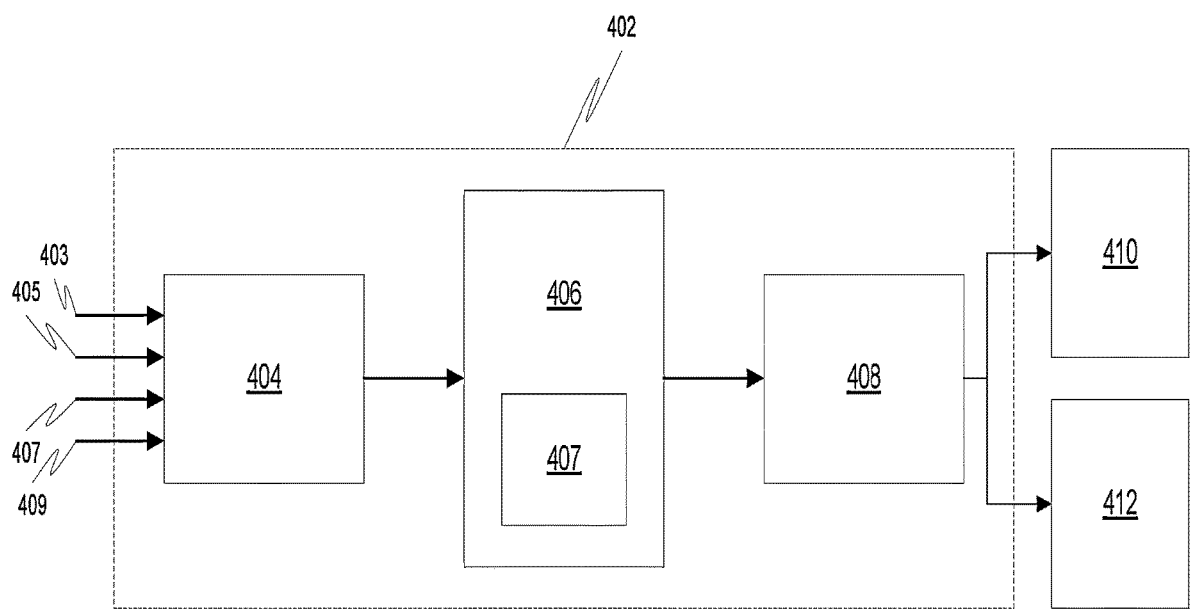
FIG. 4 is a functional block diagram depicting an example clearance risk detection system in a vehicle, in accordance with various embodiments.

FIG. 4 is a functional block diagram depicting an example clearance risk detection system 402 in a host vehicle. The example clearance risk detection system 402 includes a monitoring module 404, an object classification module 406, and a communication module 408.

The example monitoring module 404 is configured to identify a terrain object in a travel path of the vehicle based on camera image data 403 and/or other sensor data 405 and retrieve vehicle state information, such as current ride height setting 407 and tire pressure 409.

The example object classification module 406 is configured to classify the terrain object. In various embodiments, the example object classification module 406 is configured to classify the terrain object based on whether the host vehicle can clear the terrain object without raising vehicle ride height, whether the host vehicle can clear the terrain object with raising vehicle ride height, and whether the host vehicle cannot clear the terrain object with raising vehicle ride height. In various embodiment, classifying the terrain object based on whether the host vehicle can clear the terrain object with raising vehicle ride height includes classifying the terrain object based on whether without raising vehicle ride height the terrain object can clear the highest point of underbody but not the lowest point of underbody; or without raising the vehicle ride height the terrain object cannot clear the highest point of underbody. This may be used to determine the amount of ride height raising needed to clear the terrain object. In various embodiments, machine vision software is applied to external camera feeds, trained to identify objects classified as "solid terrain". This classification includes factors such as size, shape, and contact with the ground. Size/shape factors can factor out unscalable obstacles such as trees and telephone poles, as well as scalable "non-solid" obstacles such as bushes.

The example communication module 408 is configured to provide a first indicator (aural or visual) via a human machine interface (HMI) in the host vehicle, when appropriate, that indicates that the vehicle can clear the terrain object with a suggested raising of vehicle ride height using an air suspension system in the host vehicle. The example communication module 408 is configured to provide a second indicator (aural or visual) via the HMI, when appropriate, that indicates that the host vehicle cannot clear the terrain object with raising vehicle ride height. The example communication module 408 is configured to provide a third indicator (aural and/or visual) via the HMI, when appropriate, that indicates that the host vehicle can clear the terrain object without raising vehicle ride height. The example communication module 408 is further configured to automatically raise the vehicle ride height via the air suspension system to clear the terrain object when the terrain object is classified as an object that can be cleared by the host vehicle by raising the vehicle ride height and automatic ride height raising is available in the host vehicle.

The clearance risk detection system 402 interacts with a Human Machine Interface (HMI) 410 to provide indications. The HMI 410 can be incorporated in a vehicle dashboard or an augmented reality (AR) heads up display (HUD) and can provide a display of the host vehicle environment directly in the driver's line of sight. The HMI 410 can incorporate vehicle speaker systems to provide aural alerts and messages to the host vehicle operator. In various embodiments, when a terrain obstacle exceeds a current geometry limit, object size and position data is reported for consumption by graphical user interface (GUI) software. The GUI software, using the object size and position data, then draws a graphical overlay on the AR HUD or camera views (as shown on in-vehicle displays) which moves ("tracks") with the object as it moves across the display area. In various embodiments, different colors are used to distinguish whether an obstacle can be cleared under the vehicle's highest points, or cannot be cleared at any point under the vehicle. An additional indication is shown if the obstacle can be cleared at a higher ride height which is available. The vehicle may also automatically rise to the height which enables the clearance. If the driver does not have a camera or AR HUD in view, a series of notifications can be shown if an over-sized obstacle is in the vehicle's path. If the obstacle is clearable at a higher ride height, a notification offers this ride height to the driver. If an obstacle is going to have certain contact with the vehicle underbody, a warning notification and sound can be displayed to the driver and a camera view showing the obstacle can be immediately brought into view.

The clearance risk detection system 402 is further configured to provide instructions to the air suspension system 412 to cause the air suspension system 412 to adjust ride height to scale a terrain object.

Figure 5:
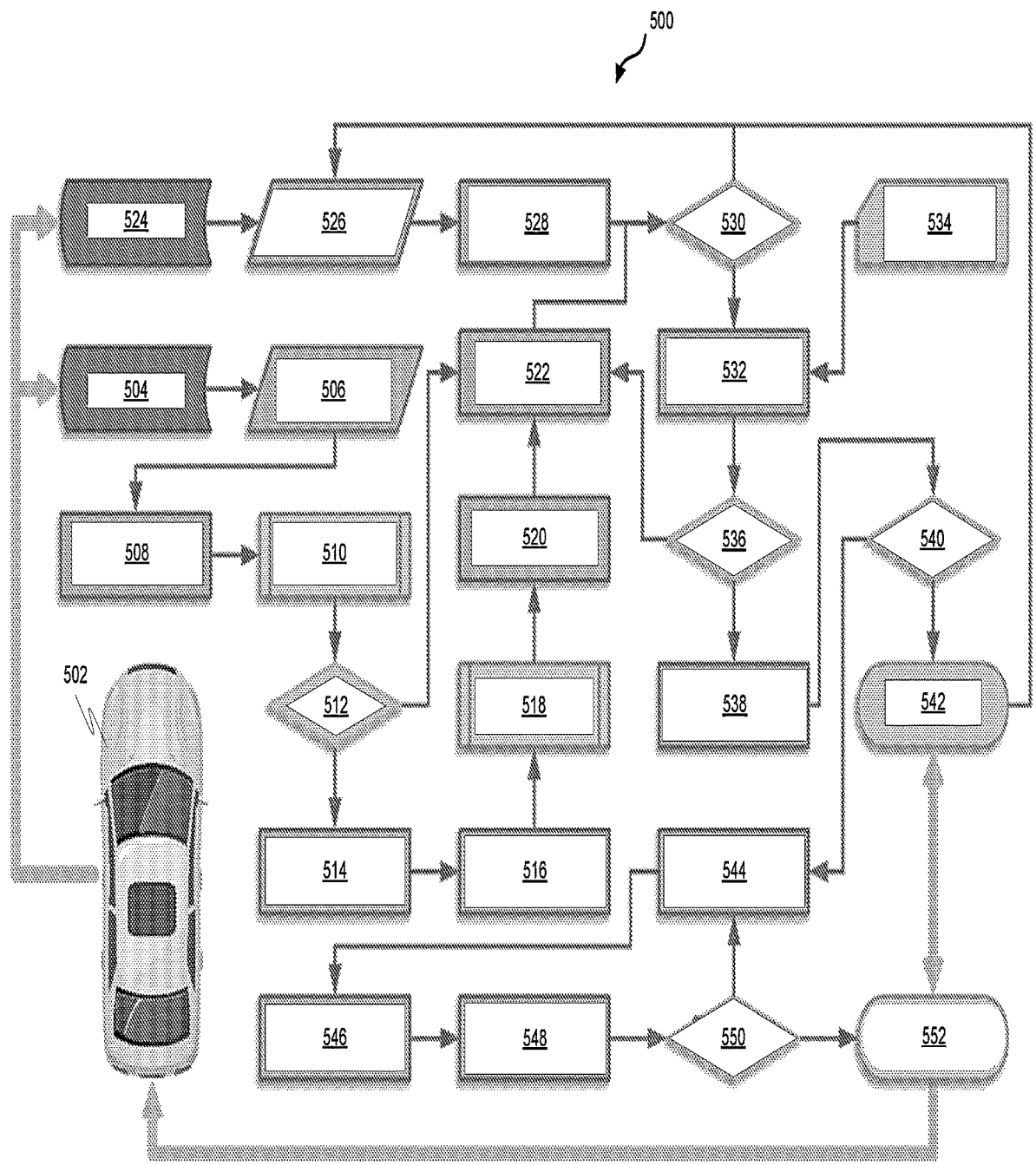
FIG. 5 is a process flow chart depicting an example process performed by an example clearance risk detection system, in accordance with various embodiments.

FIG. 5 is a process flow chart depicting an example process 500 performed by an example clearance risk detection system (e.g., example clearance risk detection system 402). The example process 500 is performed in connection with a host vehicle 502 that includes the example clearance risk detection system.

The example clearance risk detection system is implemented by a controller and is configured to receive image data (e.g., via the monitoring module 404) from one or more sensors 504 on the host vehicle 502, such one or more vehicle cameras that take images of the surroundings of the host vehicle. The image may be captured as a result of a host vehicle operator sensing a terrain object, stopping the vehicle before reaching the terrain object, and commanding the clearance risk detection system to determine if the host vehicle can clear the terrain object. In other examples, the vehicle may sense a potential terrain object and alert the host vehicle operator, wherein the host vehicle operator can stop the vehicle before reaching the terrain object and command the clearance risk detection system to determine if the host vehicle can clear the terrain object.

From the image data from the one or more sensors 504, the example clearance risk detection system (e.g., via the object classification module 406) is configured to detect the terrain object. The example clearance risk detection system does so by acquiring an image 506 of the terrain in the vehicle's path from the image data from the one or more sensors 504. The image 506 may be a single image from a vehicle camera or a stitched together image from multiple vehicle cameras.

The example process 500 includes performing image processing operations using a camera intrinsic and extrinsic transformations engine 508 on the image 506 and using edge detection and other machine vision techniques 510 to detect the terrain object in the image. The camera intrinsic and extrinsic transformations engine 508 performs intrinsic and extrinsic transformations on the image 506 to allow the example clearance risk detection system to understand the image 506. The intrinsic parameters for the intrinsic transformations may include focal length, lens distortion characteristics, field of view, etc. The extrinsic parameters for the extrinsic transformations may include the camera position and orientation.

Edge detection and other machine vision techniques 510 may be applied to determine a boundary for a terrain object. The boundary may be determined by applying an edge/contours detection algorithm and/or a morphological processing algorithm. Edge detection algorithms can identify points where image intensity changes drastically. The points may or may not form a closed shape. Also, contour detection algorithms can identify a closed shape and draw the boundary of an object. Further, as known in the art, morphology is directed to a broad set of image processing operations that process images based on shapes. Morphological image processing algorithms have been developed that can remove imperfections in images.

The example clearance risk detection system determines, at operation 512, whether the terrain object has been detected in the image 506. If the terrain object has been detected then the example clearance risk detection system can perform additional operations to determine if the host vehicle can clear the detected terrain object. If the terrain object has not been detected then the example clearance risk detection system 402 can use shadow information to detect the terrain object.

To detect the terrain object using shadow information, the example clearance risk detection system can cause (or instruct the vehicle operator to cause) vehicle lights to flash (e.g., turn lights on and off) (operation 514), capture image frames (e.g., using sensors 504) (operation 516), and analyze shadows (operation 518) in the image frames that were formed based on the flashing of the vehicle lights to estimate a terrain object (operation 520). Edge detection and other machine vision techniques 510 may be applied to estimate a boundary for a terrain object. The boundary may be determined by applying an edge/contours detection algorithm and/or a morphological processing algorithm.

At operation 522, a terrain object size is acquired. The terrain object size may be determined based on a terrain object detected from images 506 or a terrain object estimated from analyzing shadows.

In parallel with acquiring terrain object size, the example clearance risk detection system (e.g., via the monitoring module 404) is configured to retrieve from vehicle sensors 524 (such as one or more controller area network (CAN) buses in the host vehicle) dynamic host vehicle data 526 (e.g., speed, direction of travel, vehicle riding height, and tire pressure) for the host vehicle 502. The example clearance risk detection system (e.g., via the monitoring module 404) is further configured to monitor steering direction and riding height (operation 528).

Based on the object size determined at operation 522 and monitoring steering direction and riding height at operation 528, the example clearance risk detection system (e.g., via the object classification module 406) is configured to determine if the detected terrain object is in the host vehicle's path (decision 530). If the detected terrain object is not in the host vehicle's path (no at decision 530), then the example clearance risk detection system continues to retrieve dynamic host vehicle data 526 and monitor steering direction and riding height (operation 528).

If the detected terrain object is in the host vehicle's path (yes at decision 530), then the example clearance risk detection system compares the terrain object size to host vehicle clearance (operation 532). The host vehicle clearance can be determined based on the vehicle ride height, tire pressure and use of a clearance database 534 (such as a clearance look up table (LUT)).

Tables 1 and 2, shown below, illustrate example clearance LUTs. Table 1 provides an example LUT that illustrates how the lowest clearance height for a host vehicle can be determined based on a vehicle ride height and tire pressure. In this example, the air suspension system has three preset ride heights—Height 1, Height2, and Height 3. In this example, when the vehicle ride height is set at a Height 1 and the tire pressure is from 15-25 PSI (pound per square inch), then the lowest clearance height for the host vehicle is 275 mm (millimeter).

TABLE 1

| LOWEST CLEARANCE HEIGHT (MM) | | | |
|---|---|---|---|
| | <15 PSI | 15-25 PSI | 25+ PSI |
| HEIGHT 1 | 250 | 275 | 300 |
| HEIGHT 2 | 300 | 325 | 350 |
| HEIGHT 3 | 350 | 375 | 400 |

Table 2 provides an example LUT that illustrates how the door sill/trim clearance height for a host vehicle can be determined based on a vehicle ride height setting and tire pressure. In this example, when the vehicle ride height is set at a Height 3 and the tire pressure is from 25+ PSI, then the door sill/trim clearance height for the host vehicle is 465 mm.

TABLE 2

DOOR SILL/TRIM HEIGHT (MM)

|  | <15 PSI | 15-25 PSI | 25+ PSI |
|---|---|---|---|
| HEIGHT 1 | 315 | 350 | 365 |
| HEIGHT 2 | 365 | 390 | 405 |
| HEIGHT 3 | 425 | 450 | 465 |

Based on comparing the terrain object size to host vehicle clearance at operation 532, the example process 500 includes determining if the terrain object is clearable (decision 536). If the terrain object is clearable (yes at decision 536), then the example process 500 includes acquiring an object size for another terrain object (operation 522) to determine if it is clearable. If the terrain object is not clearable (no at decision 536), then the example process 500 includes marking the object in a camera feed that displays on an HMI and/or provide an alert (e.g., audio, visual, and/or haptic) using the HMI (operation 538).

At decision 540, the example process 500 includes determining if the ride height is adjustable. If the ride height is not adjustable (no at decision 540), the example process 500 includes alerting the vehicle operator (e.g., via audio, visual, and/or haptic using the HMI) at operation 542 and continuing to retrieve dynamic host vehicle data 526 and monitoring steering direction and riding height (operation 528).

If the ride height is adjustable (yes at decision 540), the example process 500 includes modifying the vehicle ride height proactively at operation 544 by, for example, sending a command to an air suspension system in the host vehicle to change the ride height setting to a setting that would allow the host vehicle to clear the obstacle. At operation 546, an index is assigned to the terrain object, and at operation 548 the terrain object is tracked.

At decision 550, process 500 includes determining if the terrain object is far from the host vehicle. If the terrain object is far from the host vehicle (yes at decision 550), then the process 500 includes resetting vehicle ride height (operation 552) and alerting the host vehicle operator (operation 542). If the terrain object is not far from the host vehicle (no at decision 550), then the process 500 includes modifying the vehicle ride height proactively at operation 544.

Figure 6A:
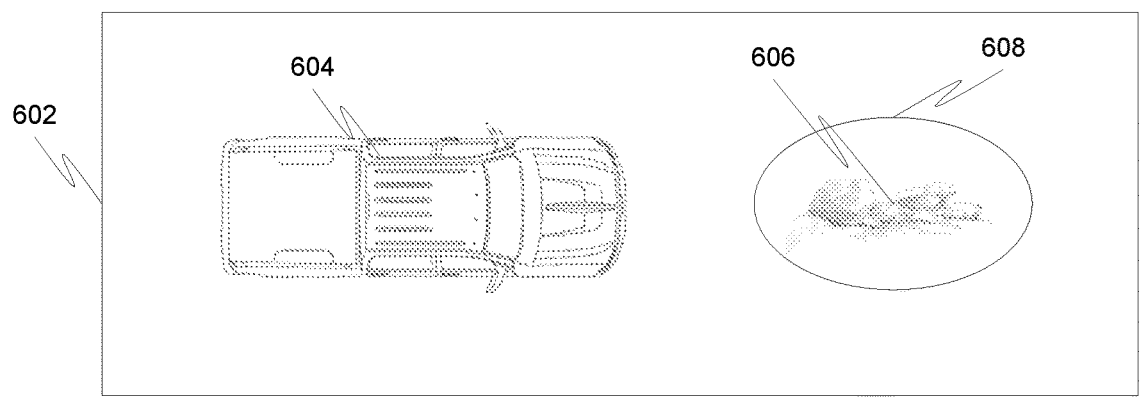
FIGS. 6A-6D are diagrams depicting example human machine interface displays for use with a clearance risk detection system, in accordance with various embodiments.

FIGS. 6A-6D are diagrams depicting example human machine interface (HMI) displays for use with a clearance risk detection system. FIG. 6A is a diagram depicting an example image in an HMI display 602 that shows a vehicle graphical element 604 representative of the host vehicle and an obstacle graphical element 606 representative of a terrain object. Also, shown is a marking 608 that can be used to indicate whether the obstacle can be cleared by the host vehicle. In various embodiments, the marking 608 may be shown in a first specific color (e.g., green color) to indicate that the obstacle can be cleared by the host vehicle, and shown in a second specific color (e.g., red color) that indicates that the obstacle cannot be cleared by the host vehicle.

Figure 6B:
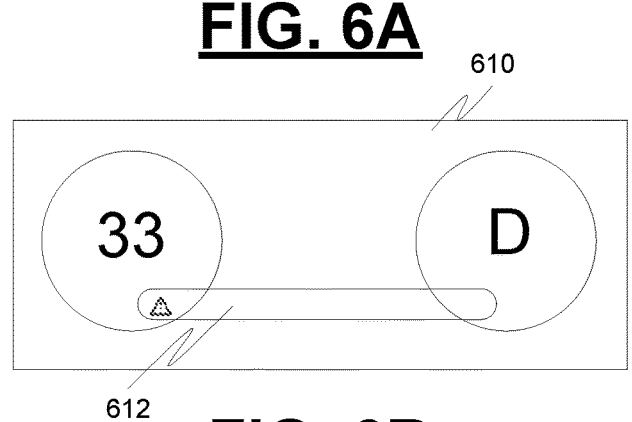
Figure 6C:
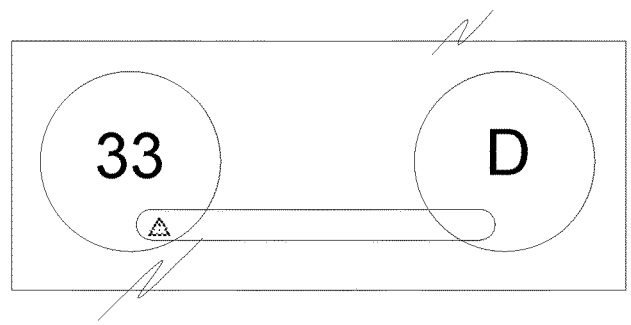
Figure 6D:
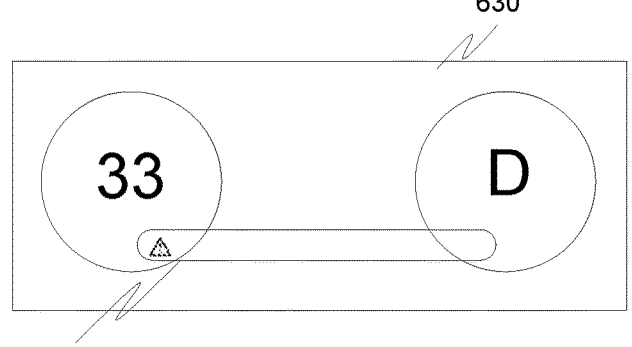

FIGS. 6B-6D are diagrams depicting how example messages from a clearance risk detection system may be provided to a vehicle operator via an HMI implemented via a dashboard. FIG. 6B is a diagram depicting an example dashboard 610 with an example first message 612 indicating that a terrain object has been detected in the vehicle path.

FIG. 6C is a diagram depicting an example dashboard 620 with an example second message 622 indicating that the clearance risk detection system is automatically raising the vehicle ride height to clear a terrain object. FIG. 6D is a diagram depicting an example dashboard 630 with an example third message 632 indicating that a detected terrain object cannot be cleared by the host vehicle.

FIGS. 7A-7E are block diagrams illustrating example parameters that the clearance risk detection system may take into account to determine if a host vehicle can clear an obstacle. FIG. 7A is a block diagram illustrating an example host vehicle 702, a tire radius—R (704), a ground height/profile—G (706), a fender clearance—C (708), and a fender overhang—O (710). In various embodiments, the R (704) is locally-stored look-up value that a user can edit; the G (706) is measured primarily by an underbody camera (such as from the sensor system 28), with other cameras/sensors as needed; the C (708) is derived from a LUT with offset from suspension travel and tire pressure, measured from G; and the O (710) is a pre-set value offset from R.

FIG. 7B is a block diagram illustrating an example terrain object 712 and a rise width—W (714). The W (714) represents the width of the terrain object 712.

FIG. 7C is a block diagram illustrating, with regard to the example terrain object 712, a ground run-up—Gb (716); a problem obstacle—T (718); an overall obstacle height—H (720); an obstacle approach zone—Ob (722); an obstacle compensated height—Hb (724); a step up—Gc (726); and a depression length Gd (728). The Gb (716) represents the height of the terrain with <x° pitch delta from current pitch (e.g., current pitch angle of vehicle as measured by device such as inclinometer or g-meter) on path to T according to vehicle vector (e.g., the path the vehicle is predicted to continue upon as measured from orientation and wheel steering angles); the T (718) represents classified terrain with height within x mm of C or greater; the H (720) represents the height of the nearest T measured from Gb; the Ob (722) represents the distance O (e.g., 710) before point T; the Hb (724) represents the height of nearest T measured from the nearest Gc; the Gc (726) represents the surface>Gb within Ob, W>x mm, and <x° delta from current vehicle pitch; and the Gd (728) represents depression in topography within Ob—the distance between leading and trailing edge of depression measured.

FIG. 7D is a block diagram illustrating the example host vehicle 702 and an unstable ground height/profile—G (730).

FIG. 7E is a block diagram illustrating the example host vehicle 702 and another unstable ground height/profile—G (732).

These relationships are illustrated in TABLE 3 below:

| R (704) | Tire Radius | Locally-stored value look-up (user can edit) |
|---|---|---|
| G (706) | Ground Height/Profile | Measured primarily by underbody camera, with other cameras/sensors as needed. |
| C (708) | Fender Clearance | LUT with offset from suspension travel (VLM) and tire pressure (TPMS), measured from G |
| O (710) | Fender Overhang | Pre-set value offset from R |
| Gb (716) | Ground run-up | Height of terrain with <x° pitch delta from current pitch on path to T according to vehicle vector |
| T (718) | Problem Obstacle | Classified terrain with height within x mm of C or greater |
| H (720) | Overall height | Height of nearest T measured from Gb |
| Ob (722) | Obstacle approach zone | Distance O before point T |

-continued

| | | |
|---|---|---|
| Hb (724) | Compensated height | Height of nearest T measured from nearest Gc |
| Gc (726) | Step up | Surface > Gb within Ob, W > x mm, and <x° delta from current vehicle pitch |
| Gd (728) | Depression Length | Depression in topography within Ob. Distance between leading and trailing edge of depression measured. |
| W (714) | Rise Width | Width of terrain object |

Figure 8:
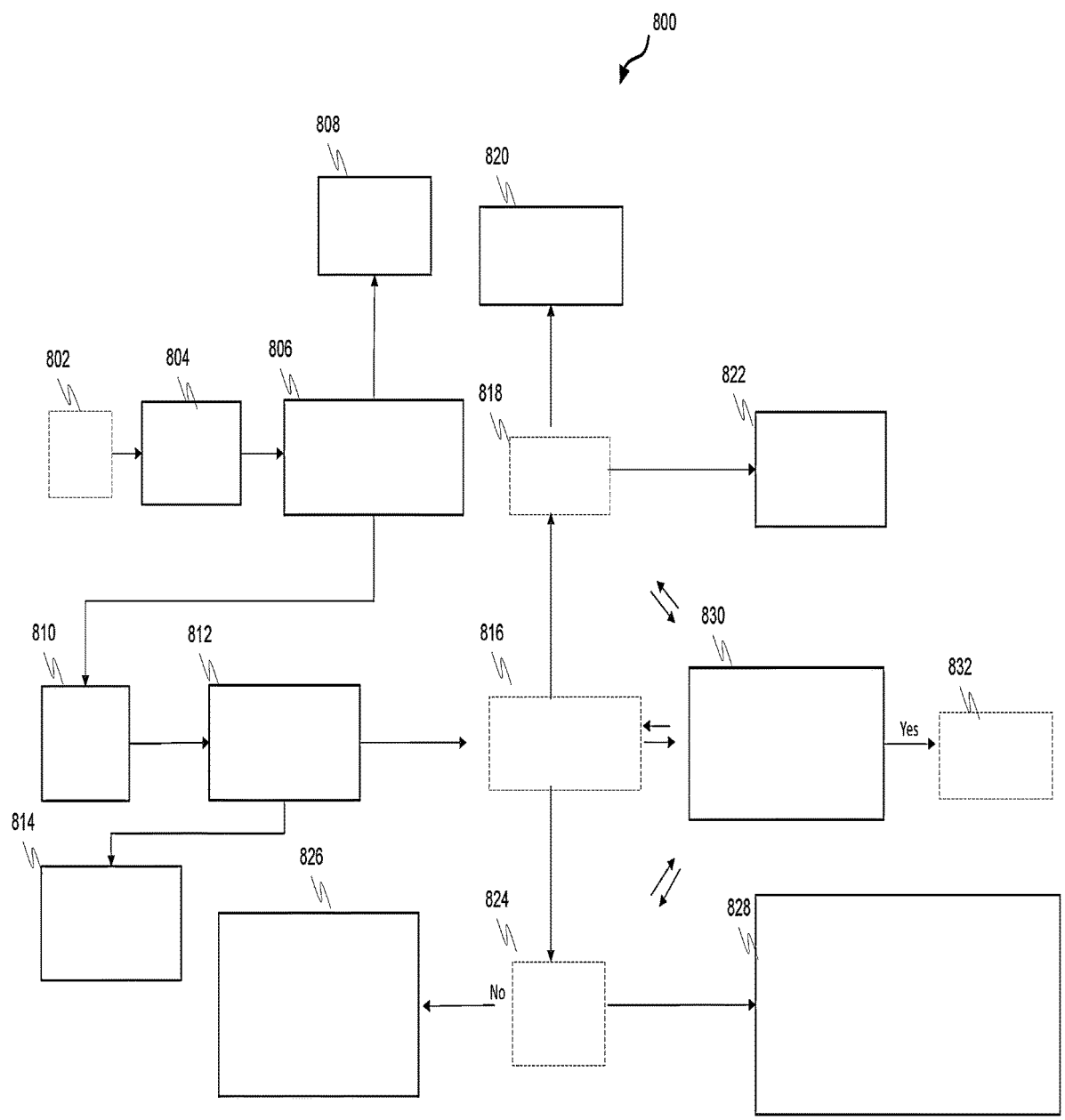
FIG. 8 is a process flow chart depicting an example process in a controller implemented clearance risk detection system in a host vehicle that uses the parameters that the clearance risk detection system may take into account to determine if a host vehicle can clear an obstacle, in accordance with various embodiments.

FIG. 8 is a process flow chart depicting an example process 800 in a controller implemented clearance risk detection system in a host vehicle that uses the parameters that the clearance risk detection system may take into account to determine if a host vehicle can clear an obstacle. The order of operation within process 800 is not limited to the sequential execution as illustrated in the FIG. 8 but may be performed in one or more varying orders as applicable and in accordance with the present disclosure.

At operation 802, when the vehicle has come to a stop (e.g., speed=0 mph), the vehicle operator can engage a clearance risk detection system initiation button (operation 804). Responsive to the clearance risk detection system initiation button being engaged, at operation 806, a vehicle stability check is performed. In various embodiments, the vehicle is determined to be stable based on whether wheel travel deltas (e.g., average distance of travel of wheel centers away from a current vehicle pitch angle) over a past predetermined distance (e.g., a calibratable distance based on tire size, and suspension travel, such as 500 mm) of travel varies less than a predetermined percent (e.g., less than 10%).

When the vehicle stability check (at operation 806) results in a determination that the vehicle is not stable, the example process 800 includes, at operation 808, providing an indication to the vehicle operator (e.g., via the HDMI) that the clearance risk detection system is unavailable. When the vehicle stability check (at operation 806) results in a determination that the vehicle is stable, the example process 800 includes, at operation 810, beginning clearance risk detection system operations (operation 810). In various embodiments, the beginning operations include detecting a terrain object by acquiring an image of the terrain in the vehicle's path and performing image processing operations to detect the terrain object in the image and/or flashing vehicle lights and detecting the terrain object by analyzing shadows.

At operation 812, the example process 800 includes performing a ground level check. A ground level check is performed to determine if the ground is level. When a ground measurement (G) is not successful, the example process includes, at operation 814, providing an indication to the vehicle operator (e.g., via the HMI) that the clearance risk detection system is unavailable. The system unavailability message may include, when appropriate, a suggestion to clean the cameras and/or sensors to allow G measurement. When the G measurement is successful, the example process includes detecting terrain objects and classifying the detected terrain objects based on obstacle height (H) versus vehicle clearance (C).

At operation 816, a determination is made regarding whether classified obstacles were detected with H>C within the vehicle projected path. When classified obstacles are not detected with H>C within the vehicle projected path (no at operation 816), the example process 800 includes, at operation 818, determining if Gd depressions create an Hb>C.

If it is determined that Gd depressions do not create an Hb>C (no at operation 818), then the example process 800 includes, at operation 820, providing an indication to the vehicle operator that the detected obstacle(s) in the vehicle path can be cleared by the vehicle. In various embodiments, the indication to the vehicle operator that the detected obstacle(s) in the vehicle path can be cleared by the vehicle may include an image in the HMI of the obstacle(s) with some marking (e.g., a green marking) that indicates that the obstacle(s) can be cleared. In various embodiments, the indication to the vehicle operator that the detected obstacle(s) in the vehicle path can be cleared by the vehicle may include a textual or aural indication via the HMI that indicates that the obstacle(s) can be cleared.

If it is determined that Gd depressions do create an Hb>C (yes at operation 818), then the example process 800 includes, at operation 822, providing an indication to the vehicle operator that a detected obstacle(s) in the vehicle path cannot be cleared by the vehicle. In various embodiments, the indication to the vehicle operator that the detected obstacle(s) in the vehicle path cannot be cleared by the vehicle may include an image in the HMI of the obstacle(s) with some marking (e.g., a red marking) that indicates that the obstacle(s) cannot be cleared. In various embodiments, the indication to the vehicle operator that the detected obstacle(s) in the vehicle path cannot be cleared by the vehicle may include a textual or aural indication via the HMI that indicates that the obstacle(s) cannot be cleared.

When classified obstacles are detected with H>C within the vehicle projected path (yes at operation 816), the example process 800 includes, at operation 824, determining if rising steps Gc are available in the current path creating an Hb>C.

If it is determined that rising steps Gc are available in the current path that do not create an Hb>C (no at operation 824), then the example process 800 includes, at operation 826, providing an image in the HMI of the obstacle(s), predicted tire tracks to clear the obstacle(s), and raising the ride height if necessary to clear the obstacle(s). In various embodiments, the obstacle(s) are marked (e.g., in red) to indicate that they cannot be cleared until the vehicle exceeds a vehicle stability check.

If it is determined that rising steps Gc are available in the current path that create an Hb>C (yes at operation 824), then the example process 800 includes, at operation 828, providing an image in the HMI of the obstacle(s), predicted tire tracks to clear the obstacle(s), and raising the ride height if necessary to clear the obstacle(s). In various embodiments, the obstacle(s) are marked (e.g., in green) to indicate that it can be cleared while tire tracks maintain Gc in path to T. In various embodiments, the obstacle(s) are marked (e.g., in red) to indicate that it cannot be cleared when Gc falls out of path but remains in path of vehicle. In various embodiments, the markings are removed when vehicle exceeds stability check.

The example process 800 includes, at operation 830, performing dynamic confidence checks during operation. In various embodiments, dynamic confidence checks are performed due to vehicle movement changing T, Gc, or Gd measurements. In various embodiments, dynamic confidence checks are performed due to vehicle movement introducing unmeasured terrain. When the dynamic confidence checks so indicated, the example process includes, at operation 832, prompting the vehicle operator to stop vehicle motion and reengage the system to re-map the terrain.

Figure 9:
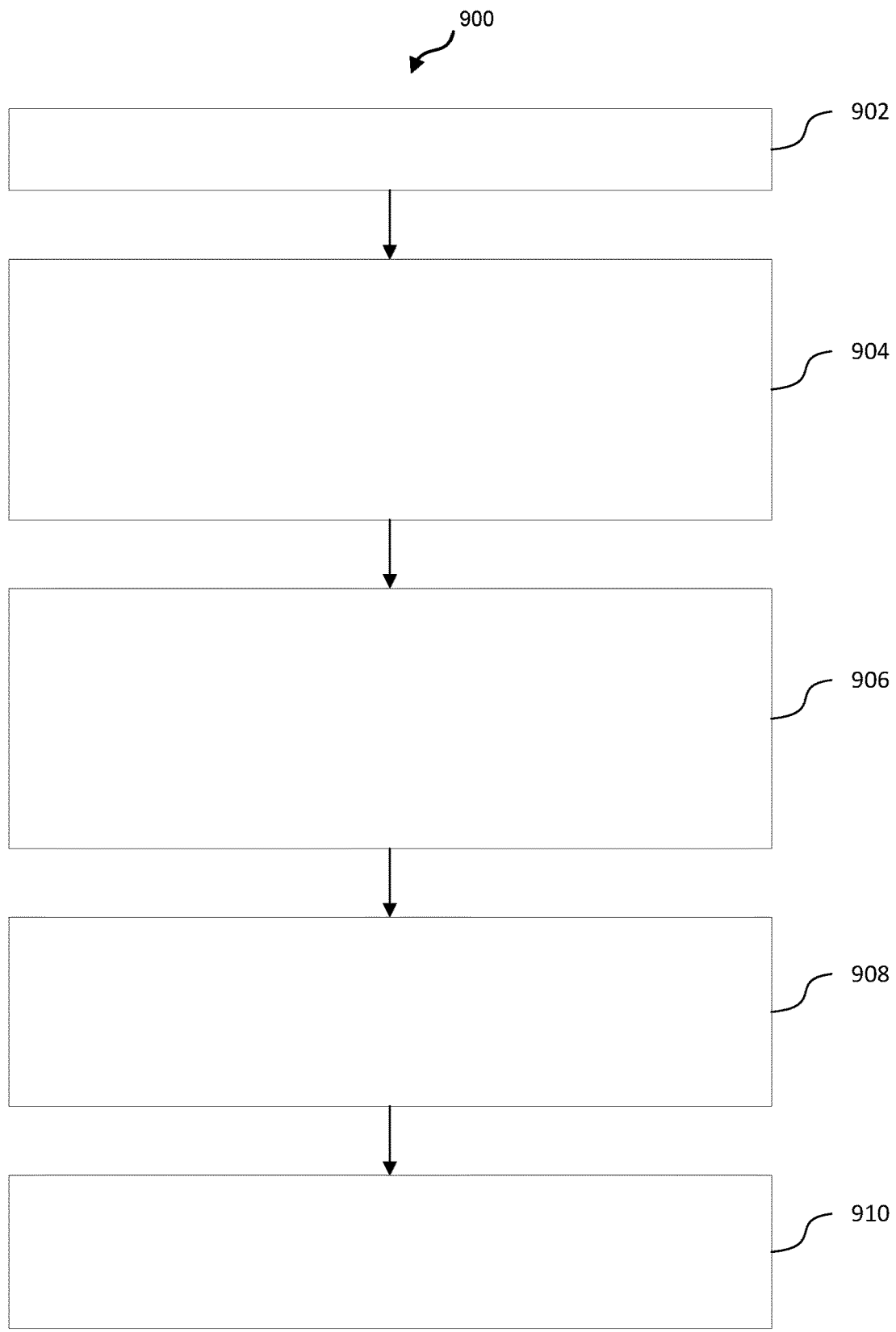
FIG. 9 is a process flow chart depicting an example process in a controller implemented clearance risk detection system in a host vehicle, in accordance with various embodiments.

FIG. 9 is a process flow chart depicting an example process 900 in a controller implemented clearance risk detection system in a host vehicle. The order of operation within process 900 is not limited to the sequential execution as illustrated in the FIG. 9 but may be performed in one or more varying orders as applicable and in accordance with the present disclosure.

At operation 902, the example process 900 includes identifying a terrain object based on camera image data in a travel path of the host vehicle.

At operation 904, the example process 900 includes classifying the terrain object. The terrain object is classified based on whether: the host vehicle can clear the terrain object without raising vehicle ride height, the host vehicle can clear the terrain object with raising vehicle ride height (e.g., without raising vehicle ride height can clear highest point of underbody but not lowest point of underbody; or w/o raising vehicle ride height cannot clear highest point of underbody), and the host vehicle cannot clear the terrain object with raising vehicle ride height.

At operation 906, the example process 900 includes providing a first indicator (aural or visual) via a human machine interface (HMI) in the host vehicle that indicates that the host vehicle can clear the terrain object with a suggested raising of vehicle ride height using an air suspension system in the host vehicle that is configured to dynamically raise or lower ride height of the host vehicle when the terrain object is classified as an object that can be cleared by the host vehicle by raising the vehicle ride height.

At operation 908, the example process 900 includes automatically raising the vehicle ride height via the air suspension system to clear the terrain object when the terrain object is classified as an object that can be cleared by the host vehicle by raising the vehicle ride height and automatic ride height raising is available in the host vehicle.

At operation 910, the example process 900 includes providing a second indicator (aural or visual) via the HMI that indicates that the host vehicle cannot clear the terrain object with raising vehicle ride height when the terrain object is classified as an object that the host vehicle cannot clear with raising vehicle ride height.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A host vehicle comprising:
    an air suspension system that is configured to dynamically raise or lower ride height of the host vehicle;
    a human machine interface (HMI) comprising a display screen; and
    a controller for implementing a clearance risk detection system, the controller configured to:
    identify a terrain object in a travel path of the host vehicle;
    classify the terrain object based on whether: a host vehicle ride height allows the host vehicle to clear the terrain object without a vehicle ride height adjustment, a raising of host vehicle ride height allows the host vehicle to clear the terrain object, and a vehicle ride height adjustment is not available that will allow the host vehicle to clear the terrain object;
    provide a first indicator based on terrain object classification via the HMI that indicates that a suggested raising of vehicle ride height allows the host vehicle to clear the terrain object; and
    provide a second indicator based on terrain object classification via the HMI that indicates that raising vehicle ride height will not allow the host vehicle to clear the terrain object.

2. The host vehicle of claim 1, wherein the controller is configured to automatically raise the vehicle ride height via the air suspension system to clear the terrain object when raising vehicle ride height will allow the host vehicle to clear the terrain object.

3. The host vehicle of claim 1, wherein the controller is further configured to:
    provide the first indicator only when automatically raising the vehicle ride height to clear the terrain object is not available in the host vehicle.

4. The host vehicle of claim 1, wherein the HMI is configured to provide an augmented reality (AR) view of a vehicle travel path that includes the terrain object, and wherein to provide the first indicator via the HMI, the controller is configured to:
    provide a graphical element adjacent to the terrain object depicted in the vehicle travel path displayed on the HMI that identifies that raising vehicle ride height will allow the host vehicle to clear the terrain object.

5. The host vehicle of claim 4, wherein to provide the second indicator via the HMI, the controller is further configured to:
    provide a graphical element adjacent to the terrain object depicted in the vehicle travel path displayed on the HMI that identifies that raising vehicle ride height will not allow the host vehicle to clear the terrain object.

6. The host vehicle of claim 5, wherein the controller is further configured to provide a graphical element adjacent to the terrain object depicted in the vehicle travel path displayed on the HMI that identifies that the vehicle ride height is high enough to allow the host vehicle to clear the terrain object without raising vehicle ride height.

7. The host vehicle of claim 1, wherein to identify the terrain object in the travel path of the host vehicle, the controller is configured to:
    acquire one or more image frames in the travel path of the host vehicle; and
    apply edge detection techniques to identify an object.

8. The host vehicle of claim 7, wherein to identify the terrain object in the travel path of the host vehicle when object detection is unclear, the controller is further configured to:
    flash vehicle lights to create a shadow of the terrain object;
    capture an image frame that includes the shadow of the terrain object;
    analyze the shadow; and
    estimate an object dimension based on analyzing the shadow.

9. The host vehicle of claim 1, wherein to classify the terrain object the controller is configured to:
    acquire an object dimension for the terrain object;
    determine whether the terrain object is in the travel path of the host vehicle based on speed and steering direction of the host vehicle; and
    determine whether the terrain object is clearable by the host vehicle based on riding height and tire pressure of the host vehicle.

10. The host vehicle of claim 9, wherein to classify the terrain object the controller is further configured to determine whether the terrain object is clearable by the host vehicle based on riding height and tire pressure of the host vehicle using a look up table.

11. A method in a controller-implemented clearance risk detection system in a host vehicle, the method comprising:
    identifying a terrain object based on camera image data in a travel path of the host vehicle;
    classifying the terrain object based on whether: a host vehicle ride height allows the host vehicle to clear the terrain object without a vehicle ride height adjustment, a raising of host vehicle ride height allows the host vehicle to clear the terrain object, and a vehicle ride height adjustment is not available that will allow the host vehicle to clear the terrain object;
    providing a first indicator based on terrain object classification via a human machine interface (HMI) in the host vehicle that indicates that a suggested raising of vehicle ride height using an air suspension system in the host vehicle allows the host vehicle to clear the terrain object; and
    providing a second indicator based on terrain object classification via the HMI that indicates that raising vehicle ride height will not allow the host vehicle to clear the terrain object.

12. The method of claim 11, comprising automatically raising the vehicle ride height via the air suspension system to clear the terrain object when raising vehicle ride height will allow the host vehicle to clear the terrain object.

13. The method of claim 11, further comprising:
    providing the first indicator only when automatically raising the vehicle ride height to clear the terrain object is not available in the host vehicle.

14. The method of claim 11, wherein the HMI is configured to provide an augmented reality (AR) view of a vehicle travel path that includes the terrain object, and providing the first indicator via the HMI comprises:
    providing a graphical element adjacent to the terrain object depicted in the vehicle travel path displayed on the HMI that identifies that raising vehicle ride height will allow the host vehicle to clear the terrain object.

15. The method of claim 11, wherein providing the second indicator via the HMI comprises:
    providing a graphical element adjacent to the terrain object depicted in a vehicle travel path displayed on the HMI that identifies that raising vehicle ride height will not allow the host vehicle to clear the terrain object.

16. The method of claim 15, further comprising providing a graphical element adjacent to the terrain object depicted in the vehicle travel path displayed on the HMI that identifies that the vehicle ride height is high enough to allow the host vehicle to clear the terrain object without raising vehicle ride height.

17. The method of claim 11, wherein identifying the terrain object in the travel path of the host vehicle comprises:
    acquiring one or more image frames in the travel path of the host vehicle; and
    applying edge detection techniques to identify an object.

18. The method of claim 17, wherein identifying the terrain object in the travel path of the host vehicle when object detection is unclear comprises:
    flashing vehicle lights to create a shadow of the terrain object;
    capturing an image frame that includes the shadow of the terrain object;
    analyzing the shadow; and
    estimating an object dimension based on analyzing the shadow.

19. The method of claim 11, wherein classifying the terrain object comprises:
    acquiring an object dimension for the terrain object;
    determining whether the terrain object is in the travel path of the host vehicle based on speed and steering direction of the host vehicle; and
    determining whether the terrain object is clearable by the host vehicle based on riding height and tire pressure of the host vehicle.

20. A clearance risk detection system in a host vehicle comprising a controller, the controller configured to:
    identify a terrain object in a travel path of the host vehicle;
    classify the terrain object based on whether: a host vehicle ride height allows the host vehicle to clear the terrain object without a vehicle ride height adjustment, a raising of host vehicle ride height allows the host vehicle to clear the terrain object, and a vehicle ride height adjustment is not available that will allow the host vehicle to clear the terrain object;
    provide a first indicator based on terrain object classification via a human machine interface (HMI) that indicates that a suggested raising of vehicle ride height using an air suspension system in the host vehicle allows the host vehicle to clear the terrain object;
    provide a second indicator based on terrain object classification via the HMI that indicates that raising vehicle ride height will not allow the host vehicle to clear the terrain object; and
    automatically raise the vehicle ride height via an air suspension system to clear the terrain object when raising vehicle ride height will allow the host vehicle to clear the terrain object.

* * * * *